United States Patent [19]

Iida

[11] 4,239,357
[45] Dec. 16, 1980

[54] CAMERA FOR AUTOMATIC AND MANUAL FOCUSING

[75] Inventor: Yozo Iida, Tokyo, Japan

[73] Assignee: Nippon Kogaku K.K., Tokyo, Japan

[21] Appl. No.: 12,520

[22] Filed: Feb. 15, 1979

[30] Foreign Application Priority Data

Feb. 17, 1978 [JP] Japan .................................. 53-16602

[51] Int. Cl.³ ........................... G03B 7/08; G03B 3/00
[52] U.S. Cl. ....................................... 354/25; 354/198
[58] Field of Search .......................... 354/25, 195–201; 352/140; 355/56

[56] References Cited

U.S. PATENT DOCUMENTS

| 4,110,769 | 8/1978 | Schutz et al. | 354/195 |
| 4,153,903 | 5/1979 | Pizzuti et al. | 354/195 |

Primary Examiner—L. T. Hix
Assistant Examiner—Thomas H. Tarcza

Attorney, Agent, or Firm—Fitzpatrick, Cella, Harper & Scinto

[57] ABSTRACT

A camera which permits automatic and manual focusing operation includes an objective lens structure capable of assuming a condition ready for automatic focusing and a condition ready for manual focusing. The objective lens structure has a focusing lens, a manual focusing operating member capable of moving the focusing lens by extraneous operation when the lens structure is in the condition ready for the manual focusing, and signal means for indicating which of the two conditions the lens structure assumes. The camera further includes an automatically focusing device for measuring the distance to an object to be photographed and generating an output for moving the focusing lens in accordance with the measured distance, and means responsive to the signal means to render the automatically focusing device inoperative when the signal means is indicating the condition ready for manual focusing.

5 Claims, 2 Drawing Figures

CAMERA FOR AUTOMATIC AND MANUAL FOCUSING

BACKGROUND OF THE INVENTION

1. Field of the Invention

This invention relates to a camera which permits automatic and manual focusing operations.

2. Description of the Prior Art

In known cameras of this type, when provided with an objective lens tube which can effect change-over operation between manual focusing and automatic focusing, there is a disadvantage in that proper focusing cannot be accomplished if an automatically focusing device is operated by mistake under the manually focusing operating condition of the objective lens tube.

SUMMARY OF THE INVENTION

An object of the present invention is to provide a camera in which the automatic focusing device is rendered inoperative when the objective lens tube is in manually focusing operating condition.

The invention will become fully apparent from the following detailed description thereof taken in conjunction with the accompanying drawings.

DESCRIPTION OF THE PREFERRED EMBODIMENTS

Figure 1:
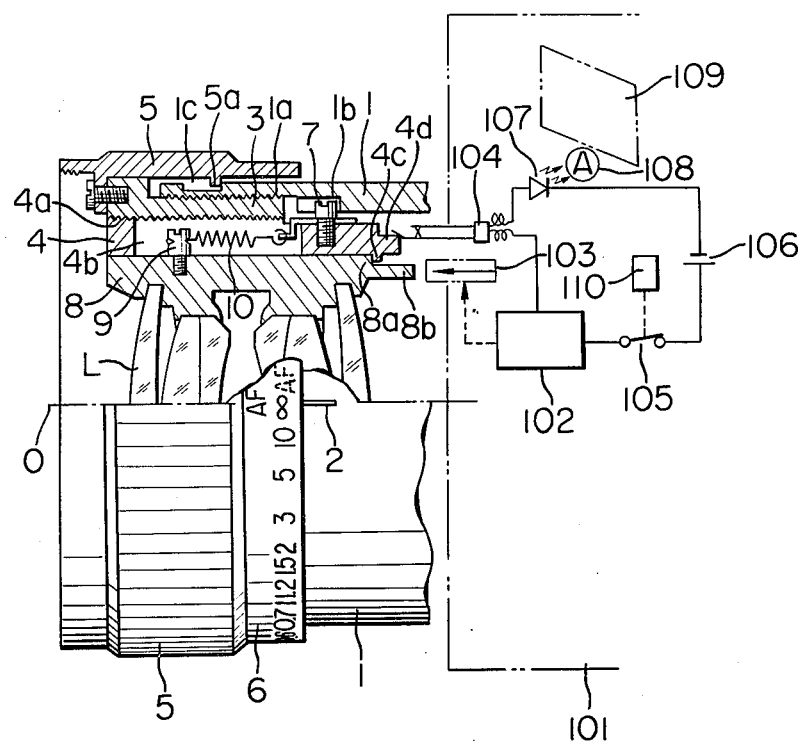
FIG. 1 is a partial cross-sectional view schematically showing a first embodiment of the present invention.

In FIG. 1, an automatic focusing device 102 provided within a camera body 101, as is well-known, receives light from an object to be photographed, by a light receiving element, detects the focused condition in accordance with the output thereof, and controls the position of a lens supporting member 8 of an objective lens structure by an actuating member 103, as will hereinafter be described, thereby accomplishing the focus adjustment. Of course, this focusing device 102 may be of any type which detects the distance to the object by the use of an ultrasonic signal. A switch 104 is ON-OFF-controlled by the automatic focusing signal projection 4d of a manual focusing adjust ring 4 and as will later be described, detects whether the focusing lens supporting member 8 is in manual or automatic focusing operating condition. A main switch 105 may be closed in response to depression of a shutter release button 110. A light-emitting diode 107 is for illuminating a display symbol 108 for displaying whether the automatic focusing device 102 is operating or not, and the display symbol 108 illuminated thereby may be displayed within a finder 109.

The switch 104 and the main switch 105 are connected in series and the power supply circuit from a power source 106 to the automatic focusing device 102 may be closed by closing these switches.

The objective lens structure will now be described. The fixing portion 1 of the objective lens structure is provided with a helicoid 1a in the left inner periphery thereof as viewed in FIG. 1, and the unshown right end thereof is directly fixed to the camera body 101 or removably coupled to the camera body 101. A fixed index mark 2 is provided in the outer periphery of the fixing portion 1, and a first translation guide groove 1b extending in the direction of the optic axis O of a lens L is formed in the inner periphery of the fixing portion 1.

The helicoid on the outer periphery of a double helicoid ring 3 meshes with the helicoid 1a on the fixing portion 1 while the helicoid on the inner periphery thereof meshes with a helicoid 4a provided in the outer periphery of a manual focusing adjust ring 4. A manual focusing ring (distance ring) 5 having a distance scale 6 and an automatic focus position mark AF formed on the outer periphery thereof and opposed to a fixed index mark 2 is formed integrally with the double helicoid ring 3.

A groove 1c formed circumferentially of the fixing portion 1 and a projection 5a formed on the manual focusing ring 5 together constitute a limit for movement of the manual focusing ring 5 in the direction of the optic axis.

A first guide pin 7 having the head thereof fitted in the first translation guide groove 1b is secured to the outer periphery of the manual focusing adjust ring 4, and a second translation guide groove 4b extending in the direction of the optic axis of the lens L is formed in said outer periphery. This focusing adjust ring 4 has a manual focusing interlocking projection 4c at the right-hand end thereof.

The lens supporting member 8 for supporting the lens L movable in the direction of the optic axis for focusing is slidably supported on the inner periphery of the manual focusing adjust ring 4 and has a stepped portion 8a and an automatic focusing interlocking projection 8b at the right-hand end thereof, the stepped portion 8a being engageable with the focusing interlocking projection 4c. A second guide pin 9 fitted in the second translation guide groove 4b is secured to the outer periphery of the lens supporting member 8. A spring 10 is stretched between the first 7 and the second guide pin 9 and biases the lens supporting member 8 so that the manual focusing interlocking projection 4c becomes engaged with the stepped portion 8a.

When the mark AF is registered with the index mark 2 by rotation of the manual focusing ring 5, this objective lens structure assumes a position ready for automatic focusing and, when it is deviated therefrom, the objective lens structure assumes a position ready for manual focusing. Thus, the ring 5 also acts as the change-over means for the automatic and manual focusing operation.

Operation will now be described. In the case of the automatic focusing operation, the automatic focusing mark AF of the operating ring 5 is opposed to the fixed index mark 2. This automatic focused condition is shown in FIG. 1, wherein the automatic focusing interlocking projection 8b bears against the actuating member 103. Also, the detecting switch 104 is closed by the automatic focusing signal projection 4d. In this condition, when the shutter release button 110 is depressed to its first stage, the switch 105 is closed so that the light-emitting diode 107 is turned on by the power source 106 and the display symbol appears in the finder 109 to indicate that automatic focusing is possible and at the same time, the automatic focusing device 102 is operated, as the result of which the focusing lens supporting member 8 is leftwardly moved by the actuating member 103 against the force of the spring 10 until it reaches a position corresponding to the photographing distance detected by the device 102. When the predetermined movement of the lens supporting member 8 is accomplished, the operation of the actuating member 103 is locked and thereafter shutter release takes place by depression of the shutter release button to its second stage.

In the case of the manual focusing operation, the manual focusing ring 5 is turned to deviate the manual focusing mark AF from the index mark 2 and a desired division of the distance scale 6 is registered with the index mark. By this, the double helicoid ring 3 is rotated and the manually focusing adjust ring 4 is shifted in the direction of the optic axis by the first guide pin 7 being guided by the first translation guide groove 1b. When the manual focusing adjust ring 4 is slidden leftwardly as viewed in FIG. 1, the projection 4c engages the stepped portion 8a to thereby slide the lens supporting member 8 also leftwardly. In this manner, focusing to a desired photographing distance is accomplished. If the adjust ring 4 slides rightwardly, the lens supporting member 8 is shifted rightwardly by the action of the spring 10. Thus, the adjust ring 4 and the lens supporting member 8 slide leftwardly and rightwardly in response to rotation of the operating ring 5, thereby accomplishing the manual focusing.

During the manual focusing operation, if the automatic focusing mark AF is deviated from the index mark 2, the adjust ring 4 is moved leftwardly from its shown position, so that the switch 104 is open. Accordingly, even if the switch 105 is closed by depression of the shutter release button 110, no power is supplied to the light-emitting diode 107 and the automatic focusing device 102. Thus, the display symbol 108 is not displayed in the finder 109 to thereby indicate that the lens tube is not in automatic focused condition, and the automatic focusing device 102 is not operated.

The manual and automatic focused condition of the objective lens structure do exist overlappingly when the focusing ring 5 is at infinity position ∞ and therefore, if the shutter release button 110 is depressed at such time, the objective lens structure may sometimes be automatically focused to an object at another distance in spite of having been manually focused to an object at infinity. This problem may be solved by deviating the position of the infinity ∞ and the automatic focusing mark AF as indicated by dotted "AF" in the drawing.

Figure 2:
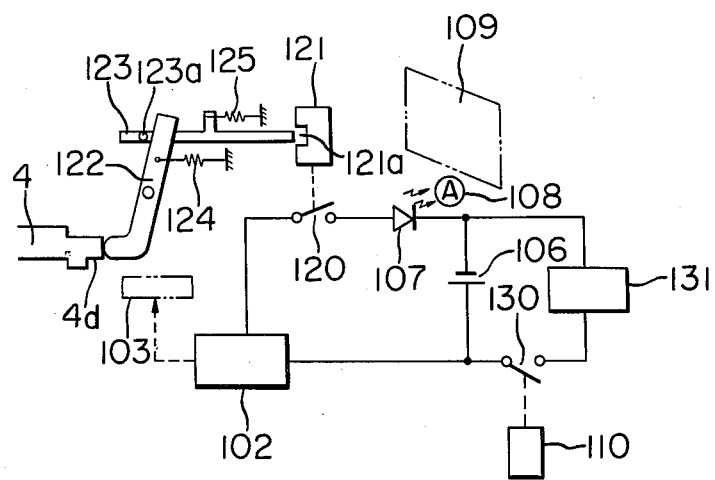
FIG. 2 illustrates essential portions of a second embodiment of the present invention.

FIG. 2 illustrates another embodiment of the present invention and chiefly shows the camera side construction.

A switch 120 may be opened and closed in response to an autofocus button 121. A detecting lever 122 is rotatable in response to the automatic focusing signal projection 4d. A switch control lever 123 having a pin 123a is horizontally slidable in response to rotation of the detecting lever 122. One end of the switch control lever 123 is insertable into a groove 121a formed in the autofocus button 121.

An electrical shutter circuit 131 is connected to a power source 106 through a switch 130. The switch 130 may be opened and closed in response to a shutter release button 110.

When the mark AF is registered with the index mark 2, the detecting lever 122 detects the position of the automatic focusing signal projection 4d and holds the switch control lever 123 in a position in which it is not inserted into the groove 121a. Therefore, the autofocus button 121 becomes depressible and when it is depressed, the switch 120 is closed and a light-emitting diode 107 is turned on to display a display symbol 108 in the finder 109 and an automatic focusing device 102 is operated. When the focusing by an actuating member 103 is completed, the depression of the autofocus button 121 is released and now a shutter release button 132 is released to effect shutter release.

When manual focusing is effected by deviating the mark AF from the index mark 2, the automatic focusing signal projection 4d is moved leftwardly from the position of FIG. 2, so that the detecting lever 122 is rotated clockwise by a spring 124. Thus, the control lever 123 is rightwardly moved by a spring 125 and inserted into the groove 121a. Thus, the autofocus button 121 becomes undepressible so that the switch 120 is not closed. Accordingly, the automatic focusing device 102 is not operated. When the shutter release button 110 is depressed, the photography by the manual focusing becomes possible.

There is obtained the following effect in this embodiment. Even if the infinity ∞ of the distance scale 6 and the automatic focus position mark AF are provided at the same position, the distinction between manual focusing and automatic focusing may be achieved by proper use of the autofocus button 121 and the shutter release button 110. This is impossible with the embodiment of FIG. 1.

The locking of the autofocus button 121 may also be electromagnetically accomplished by using a magnet.

In the above-described embodiments, the signal member 4d indicating whether the objective lens structure is set to the condition ready for the manual focusing or to the condition ready for the automatic focusing is detected and if it indicates the former, the power supply to the automatic focusing device 102 is cut off, whereas the present invention is not restricted thereto but the automatic focusing device 102 or the actuating member 103 may be rendered inoperative. Also, the signal member 4d in the present embodiment is displaceable in response to the change-over operation of the change-over means for changing over the objective lens structure to the condition ready for manual focusing or to the condition ready for automatic focusing, but the signal member may also be one which generates an electrical signal.

The foregoing embodiment has been described with respect to an example in which the entire objective lens system is moved for the focusing, but the present invention is also applicable to an objective lens system of the type in which only a part of the objective lens system is movable for focusing and in such case, the focusing lens supporting member moves only the part of the system.

I claim:
1. A camera which permits automatic focusing and manual focusing comprising:
(1) an objective lens structure capable of assuming a condition ready for the automatic focusing and a condition ready for the manual focusing, said objective lens structure having a focusing lens, a lens supporting member for said focusing lens and manual focusing operating means movable by external operation to move said lens supporting member when said structure is in the condition ready for the manual focusing;
(2) an automatic focusing device for measuring the distance to an object to be photographed and moving said lens supporting member in accordance with the measured distance irrespectively of said manual focusing operating means; and
(3) means responsive to said manual focusing operating means to render said automatic focusing device operative when said manual focusing operating means occupies a specific position.

2. A camera according to claim 1, wherein said manual focusing operating means is so interlocked with said lens supporting member that the movement of said manual focusing operating means causes the movement of said lens supporting member but that the movement of said lens supporting member does not cause the movement of said manual focusing operating means.

3. A camera according to claim 2, wherein said manual focusing operating means is movable between two extreme positions of which one is said specific position.

4. A camera according to claim 1, further comprising an externally operating member movable between an operative position in which said automatic focusing device is operative and an inoperative position, and wherein said responsive means prevents movement of said externally operating member to said operative position when said manual focusing operating means occupies a position other than said specific position.

5. A camera which permits automatic focusing and manual focusing, comprising:

(1) an objective lens structure including:
  (a) a focusing lens system;
  (b) a focusing lens system supporting member for supporting said focusing lens system;
  (c) biasing means for biasing said lens system supporting member in one direction of the optic axis of said focusing lens system; and
  (c) externally operable, manual focusing operating means for moving said lens system supporting member in said one direction through said biasing means and for directly moving said lens system supporting member in the opposite direction;
(2) an automatic focusing device;
(3) actuating means for moving said lens system supporting member in the direction of the optic axis against the biasing force of said biasing means by the output of said automatic focusing device, independently of said manual focusing operating means; and
(4) means responsive to said manual focusing operating means to render said automatic focusing device operative when said manual focusing operating means occupies a specific position.

* * * * *